United States Patent
Gundelach et al.

(10) Patent No.: US 11,273,934 B2
(45) Date of Patent: Mar. 15, 2022

(54) HEAD FOR HORIZONTAL FLOW WRAPPER PACKAGING MACHINE

(71) Applicant: DELTA SYSTEMS & AUTOMATION LLC, Lowell, AR (US)

(72) Inventors: Chad Gundelach, Bentonville, AR (US); Tom Cujak, Rogers, AR (US); Rick Calvin, Rogers, AR (US); Brian Kyles, Bentonville, AR (US)

(73) Assignee: DELTA SYSTEMS AND AUTOMATION LLC, Lowell, AR (US)

( * ) Notice: Subject to any disclaimer, the term of this patent is extended or adjusted under 35 U.S.C. 154(b) by 122 days.

(21) Appl. No.: 16/500,151

(22) PCT Filed: May 12, 2017

(86) PCT No.: PCT/US2017/032323
§ 371 (c)(1),
(2) Date: Oct. 2, 2019

(87) PCT Pub. No.: WO2018/208311
PCT Pub. Date: Nov. 15, 2018

(65) Prior Publication Data
US 2021/0101704 A1    Apr. 8, 2021

(51) Int. Cl.
*B65B 9/067*    (2012.01)
*B65B 51/30*    (2006.01)
(Continued)

(52) U.S. Cl.
CPC ............. *B65B 9/067* (2013.01); *B26D 1/405* (2013.01); *B26D 9/00* (2013.01); *B26F 1/10* (2013.01);
(Continued)

(58) Field of Classification Search
CPC ..... B65B 9/067; B65B 2220/22; B65B 61/08; B65B 51/306; B26D 1/405; B29C 66/93451; B29C 66/83513; B29C 66/4312
See application file for complete search history.

(56) References Cited

U.S. PATENT DOCUMENTS

| 4,035,984 A | 7/1977 | Gerlach |
| 4,517,786 A | 5/1985 | Barker |

(Continued)

FOREIGN PATENT DOCUMENTS

| CN | 203332485 U | 12/2013 |
| CN | 205931333 U | 2/2017 |

(Continued)

OTHER PUBLICATIONS

Supplementary EP Search Report for counterpart EP App. No. EP17909519, dated Oct. 15, 2020, listing EP1911567A1 JP2001072024A, EP1004511A2.
(Continued)

*Primary Examiner* — Robert F Long
*Assistant Examiner* — Xavier A Madison
(74) *Attorney, Agent, or Firm* — Luccarelli & Musacchio LLP; Pasquale Musacchio (57) ABSTRACT

A head for a horizontal flow wrapper packaging machine for forming a bandolier of product packages. The head includes a rotatable first shaft having a plurality of knife elements each including a blade and first and second upper crimping elements. The head also includes a rotatable second shaft having a plurality of anvil elements. A rotation speed of the second shaft is independent of the rotation speed of the first shaft. Each anvil element includes perforation and cutting surfaces and first and second lower crimping elements. A rotation speed of either the first shaft or second shaft is
(Continued)

changed to move either a knife element or an anvil element, respectively, between a perforation position and a cutting position. The first upper and first lower crimping elements and the second upper and second lower crimping elements also mate to crimp the packaging material in either the perforating or cutting positions.

19 Claims, 9 Drawing Sheets

(51) Int. Cl.
    *B65B 61/00*     (2006.01)
    *B65B 61/08*     (2006.01)
    *B29C 65/30*     (2006.01)
    *B29C 65/74*     (2006.01)
    *B29C 65/00*     (2006.01)
    *B26D 1/40*     (2006.01)
    *B26D 9/00*     (2006.01)
    *B26F 1/10*     (2006.01)

(52) U.S. Cl.
    CPC ............ *B29C 65/30* (2013.01); *B29C 65/745* (2013.01); *B29C 66/4312* (2013.01); *B29C 66/81435* (2013.01); *B29C 66/83513* (2013.01); *B29C 66/849* (2013.01); *B29C 66/93451* (2013.01); *B65B 51/306* (2013.01); *B65B 61/007* (2013.01); *B65B 61/08* (2013.01); *B65B 2220/22* (2013.01)

(56) References Cited

U.S. PATENT DOCUMENTS

| | | | | |
|---|---|---|---|---|
| 4,949,846 A * | 8/1990 | Lakey | ............ | B29C 65/18 206/484 |
| 5,628,163 A * | 5/1997 | Keopple | ............ | B65B 61/08 53/374.4 |
| 5,797,305 A * | 8/1998 | Harrod | ............ | B26D 1/626 83/304 |
| 6,085,496 A | 7/2000 | Fontanazzi et al. | | |
| 7,328,555 B2 | 2/2008 | Levy | | |
| 8,117,808 B2 | 2/2012 | Strasser | | |
| 8,919,411 B2 | 12/2014 | Ippers et al. | | |
| 9,649,810 B2 | 5/2017 | Thaerigen | | |
| 9,856,096 B2 | 1/2018 | Hanisch et al. | | |
| 10,766,203 B2 | 9/2020 | Civolani et al. | | |
| 2006/0037452 A1 * | 2/2006 | Grenier | ............ | B26D 7/20 83/469 |
| 2006/0229184 A1 * | 10/2006 | Powell | ............ | B31F 1/10 493/467 |
| 2008/0028902 A1 | 2/2008 | Baggot | | |
| 2009/0126322 A1 | 5/2009 | Fuellemann | | |
| 2011/0005169 A1 | 1/2011 | Ober | | |
| 2012/0167736 A1 * | 7/2012 | Yokoe | ............ | B26D 7/2614 83/348 |
| 2015/0047296 A1 | 2/2015 | Schneider et al. | | |
| 2015/0360380 A1 * | 12/2015 | Ferguson | ............ | B26F 1/20 83/37 |
| 2016/0114923 A1 * | 4/2016 | Kiyota | ............ | G05B 11/01 53/64 |
| 2016/0288937 A1 | 10/2016 | Grether et al. | | |
| 2018/0153211 A1 * | 6/2018 | Persson | ............ | B29C 66/81425 |

FOREIGN PATENT DOCUMENTS

| | | |
|---|---|---|
| DE | 102011075424 A1 | 11/2012 |
| EP | 1004511 A2 | 5/2000 |
| EP | 1473230 A2 | 11/2004 |
| EP | 1911567 A1 | 4/2008 |
| EP | 1710162 B1 | 6/2008 |
| EP | 2112073 A2 | 10/2009 |
| JP | 2001072024 A | 3/2001 |

OTHER PUBLICATIONS

CN Office Action dated Feb. 1, 2021 for counterpart CN App. No. 201780090674.7, listing CN203332485U, CN205931333U, CN101941538A (published as U.S. Pat. No. 20110005169A1), CN1203877A (published as U.S. Pat. No. 6085496), U.S. Pat. No. 2008028902A1, CN1211209A (published as U.S. Pat. No. 5797305), U.S. Pat. No. 4035984.

* cited by examiner

HEAD FOR HORIZONTAL FLOW WRAPPER PACKAGING MACHINE

TECHNICAL FIELD

The invention relates to a head for a horizontal flow wrapper packaging machine, and more particularly, to a head having rotatable first and second shafts, wherein a rotation speed of the second shaft is independent of the rotation speed of the first shaft, and wherein the first shaft includes a plurality of knife elements each including first and second upper crimping elements and the second shaft includes a corresponding plurality of anvil elements each including perforation and cutting surfaces and first and second lower crimping elements wherein a rotation speed of either the first shaft or second shaft is changed to move either a knife element or an anvil element, respectively, between a perforation position for perforating the packaging material and a cutting position for cutting the packaging material and wherein the first upper and first lower crimping elements mate and the second upper and second lower crimping elements mate to crimp the packaging material in either the perforating or cutting positions.

BACKGROUND

Figure 1:
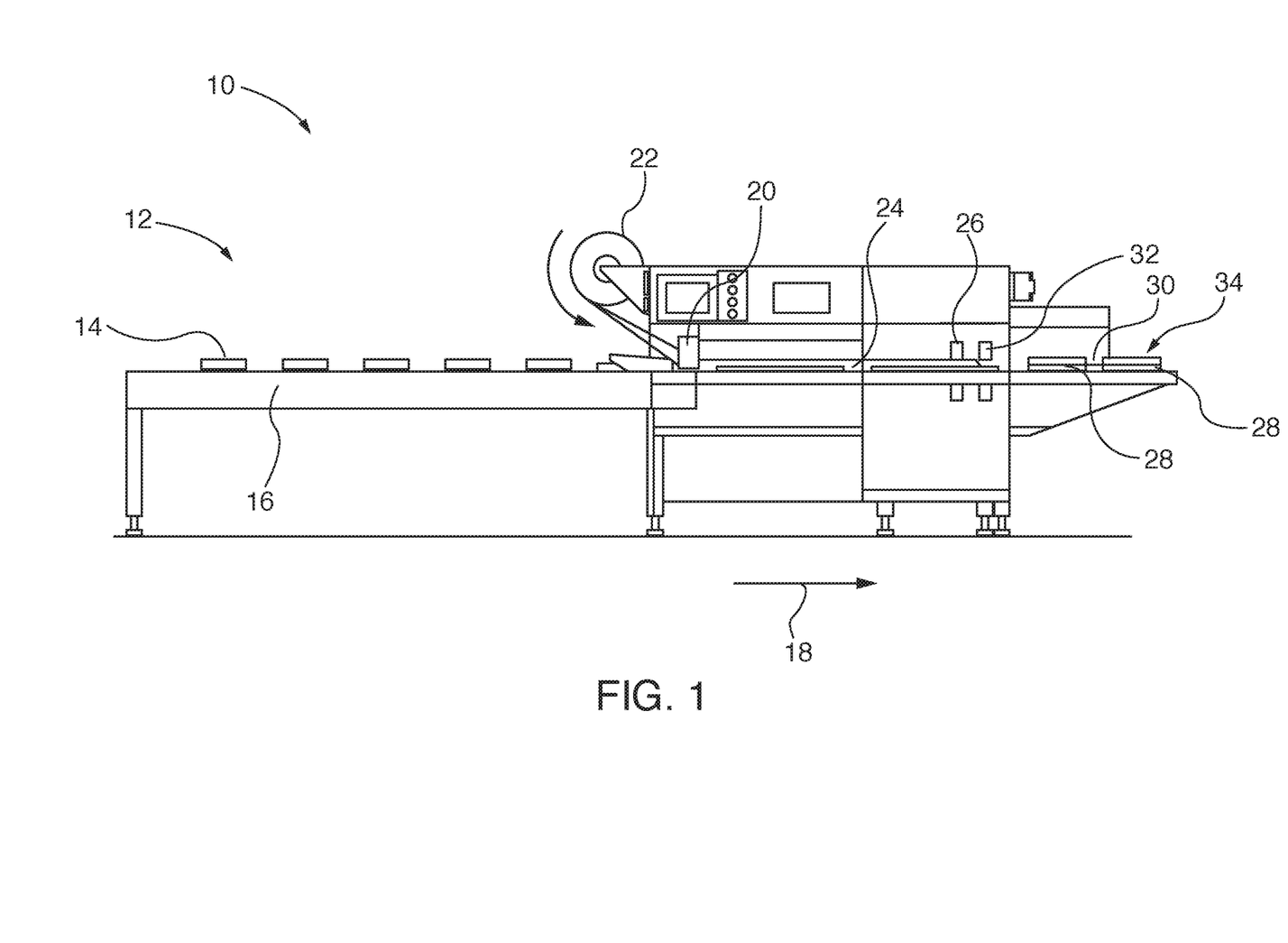
FIG. 1 depicts a conventional flow wrapper packaging machine 10.

Horizontal flow wrapper packaging machines are used to package a variety of products. Referring to FIG. 1, a conventional flow wrapper packaging machine 10 is shown. The packaging machine 10 typically includes an infeed section 12 wherein products 14 are either manually or automatically placed onto an infeed conveyor belt 16 that moves the products in a continuous motion in a product flow direction 18 to a forming box 20. The packaging machine 10 also includes at least one roll of packaging material 22 such as plastic film that is unwound and fed to the forming box 20. The forming box 20 forms the packaging material 22 into a continuous shape, such as a tubular shape 24, which surrounds a row of products 14 as the products 14 are moved on the conveyor belt 16. Edges of the packaging material 22 are joined together as the products 14 move on the conveyor belt 16 to form a longitudinal seal underneath the products 14 in a known manner. The packaging material 22 and products 14 are then moved through a first pair of rotating jaws 26 that seal and perforate a portion of the packaging material 22 in front and behind each product 14 (relative to the product flow direction 18) to form a package 28 for each product 14. Each package 28 is connected to a next package 28 by non-perforated portions 30 of the packaging material 22. The packages 28 are then moved to a second pair of rotating jaws 32 that cut sections of packaging material 22, each including a predetermined number of packages 28, to form at least one bandolier 34 (a two package bandolier 34 is shown in FIG. 1). A plurality of bandoliers 34 may then by boxed for shipping, for example.

Conventional packaging machines 10 utilize a single motor to drive a first shaft associated with a rotating jaw while a second shaft associated with another rotating jaw is driven via a gear train and/or belt arrangement connecting the first and second shafts. Further, a phasing motor may be used in conjunction with the gear train and/or belt arrangement to change a phase angle of one of the shafts. Such gear trains and/or belt arrangements substantially limit package output of the packaging machine 10 and result in relatively high component wear. It is desirable to increase the output of such packaging machines 10 while also reducing wear of packaging machine components.

SUMMARY OF THE INVENTION

A head is disclosed for a horizontal flow wrapper packaging machine for forming a bandolier of product packages from a packaging material. The head includes a rotatable first shaft having a plurality of knife elements each including a blade and first and second upper crimping elements. The head also includes a rotatable second shaft having a corresponding plurality of anvil elements, wherein a rotation speed of the second shaft is independent of the rotation speed of the first shaft and wherein each anvil element includes perforation and cutting surfaces and first and second lower crimping elements. A rotation speed of either the first shaft or second shaft is changed to move either a knife element or an anvil element, respectively, between a perforation position wherein the perforation surface is opposite the blade to perforate the packaging material and a cutting position wherein the cutting surface is opposite the blade to cut the packaging material. Further, the first upper and first lower crimping elements mate and the second upper and second lower crimping elements mate to crimp the packaging material in either the perforating or cutting positions.

A method is disclosed for forming a bandolier of product packages from a packaging material when using a horizontal flow wrapper packaging machine. The method includes providing a head having a rotatable first shaft having a plurality of knife elements each including a blade and first and second upper crimping elements. The method also includes providing in the head a rotatable second shaft having a corresponding plurality of anvil elements, wherein a rotation speed of the second shaft is independent of the rotation speed of the first shaft and wherein each anvil element includes perforation and cutting surfaces and first and second lower crimping elements. In addition, the method includes changing a rotation speed of either the first shaft or second shaft to move either a knife element or an anvil element, respectively, between a perforation position wherein the perforation surface is opposite the blade to perforate the packaging material and a cutting position wherein the cutting surface is opposite the blade to cut the packaging material. Further, the method includes mating the first upper and first lower crimping elements and the second upper and second lower crimping elements to crimp the packaging material in either the perforating or cutting positions.

Those skilled in the art may apply the respective features of the present invention jointly or severally in any combination or sub-combination.

BRIEF DESCRIPTION OF DRAWINGS

The exemplary embodiments of the invention are further described in the following detailed description in conjunction with the accompanying drawings, in which.

To facilitate understanding, identical reference numerals have been used, where possible, to designate identical elements that are common to the figures. The figures are not drawn to scale.

DESCRIPTION OF EMBODIMENTS

Although various embodiments that incorporate the teachings of the present disclosure have been shown and described in detail herein, those skilled in the art can readily devise many other varied embodiments that still incorporate these teachings. The scope of the disclosure is not limited in its application to the exemplary embodiment details of construction and the arrangement of components set forth in the description or illustrated in the drawings. The disclosure encompasses other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

Figure 2:
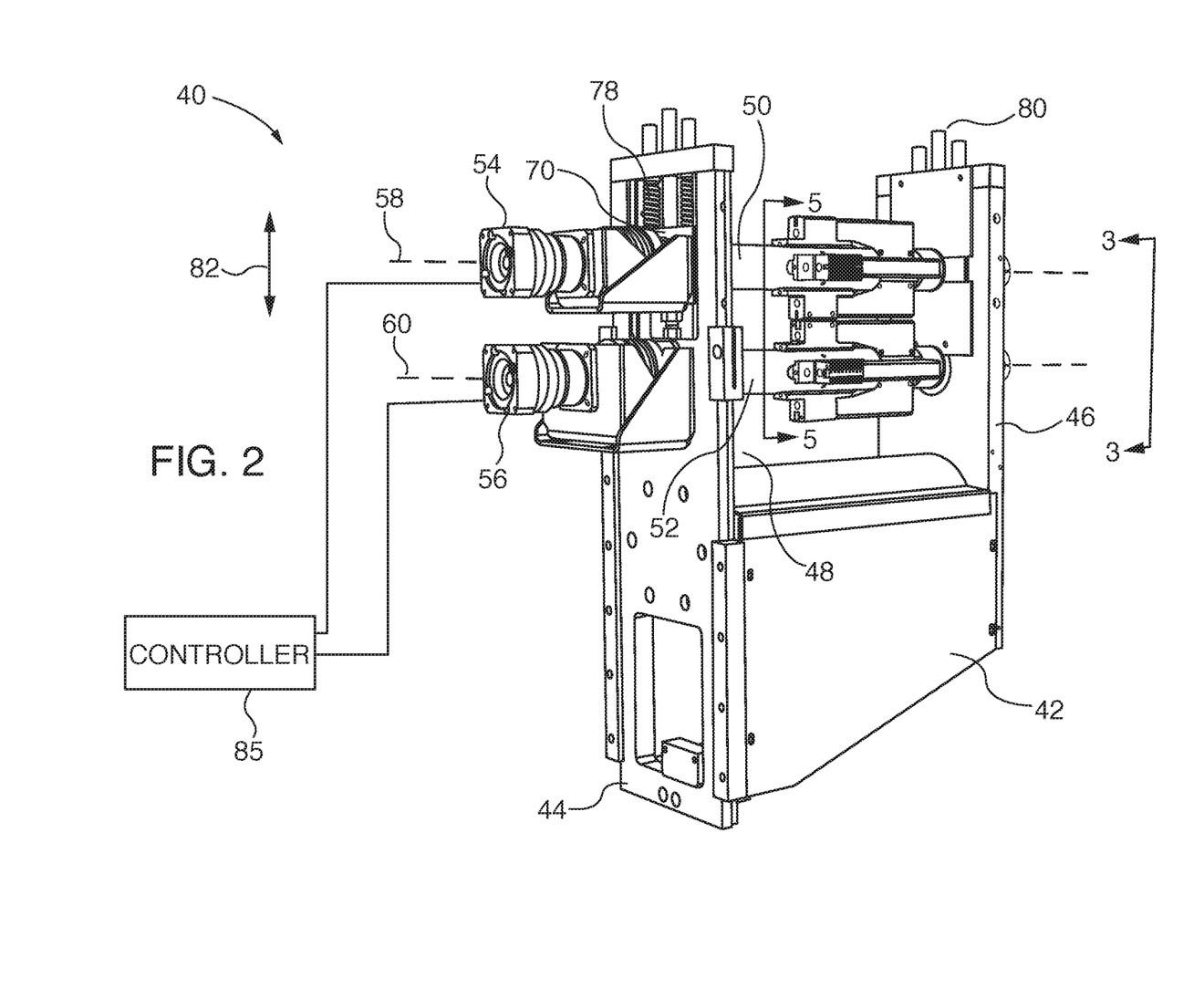
FIG. 2 is a perspective view of a head in accordance with the present invention for a flow wrapper packaging machine.

Referring to FIG. 2, a perspective view of a head 40 for a flow wrapper packaging machine 10 for forming product packages is shown. The head 40 includes a frame 42 having first 44 and second 46 vertical supports that are spaced apart to form an opening 48. Upper 50 and lower 52 shafts extend through the opening 48. The first support 44 includes upper 54 and lower 56 servo motors that independently rotate the upper 50 and lower 52 shafts about upper 58 and lower 60 horizontal axes, respectively. A controller 85 is used to independently control the upper 54 and lower 56 servo motors. The upper 54 and lower 56 servo motors may rotate the upper 50 and lower 52 shafts rotate at substantially the same rotation speed. Alternatively, upper 54 and lower 56 servo motors may rotate the upper 50 and lower 52 shafts rotate at different rotation speeds. Further, a rotation direction of the upper 50 and lower 52 shafts may also be independently controlled.

Figure 3:
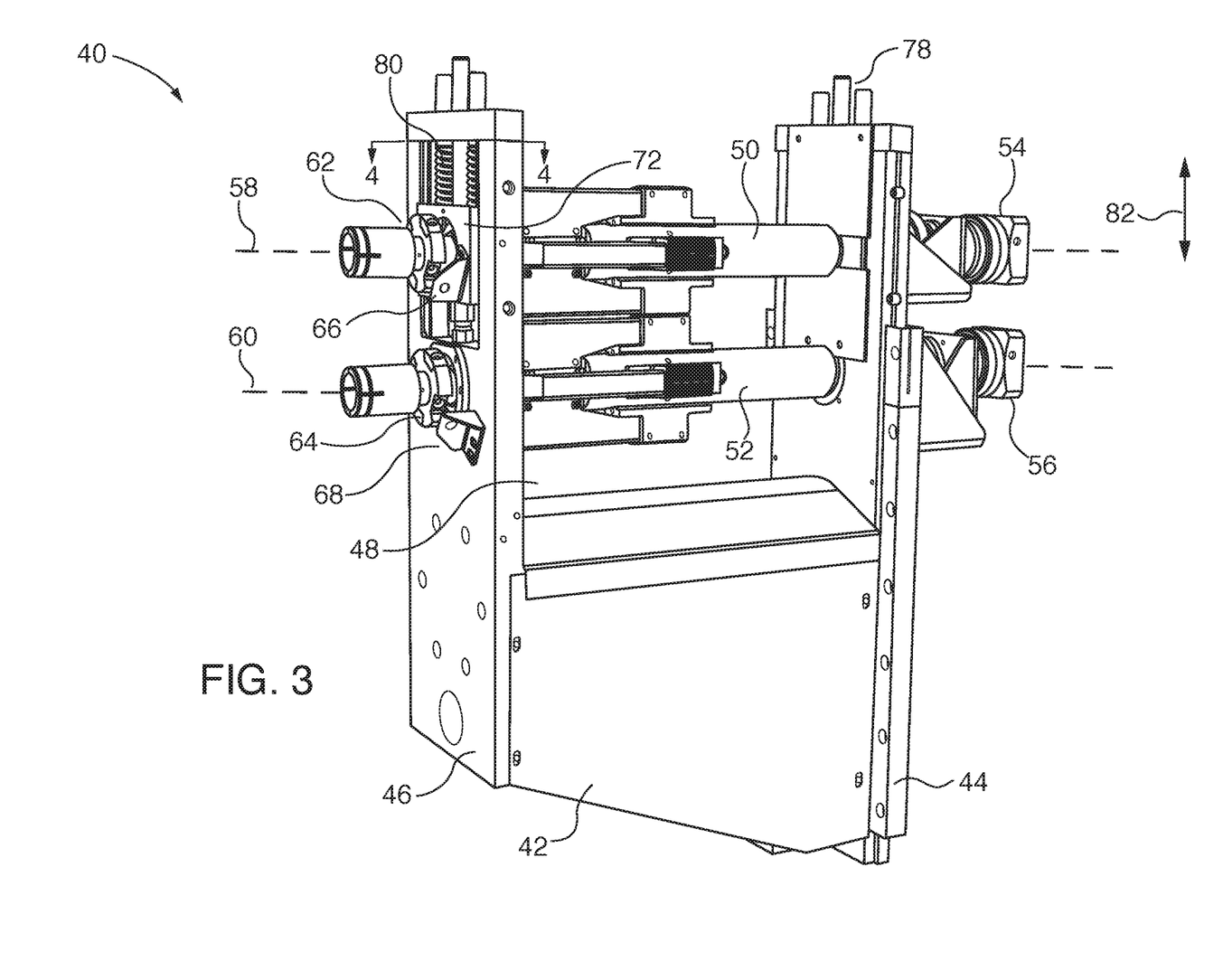
FIG. 3 is a reversed view of the head along view line 3-3 of FIG. 2.

Referring to FIG. 3, a reversed view of the head 40 along view line 3-3 of FIG. 2 is shown. The second support 46 further includes upper and lower rotary electrical interfaces, such as upper 62 and lower 64 slip rings, that support ends of the upper 50 and lower 52 shafts, respectively. The second support 46 also includes upper 66 and lower 68 rotary encoders for detecting an angular position of the upper 50 and lower 52 shafts, respectively.

Figure 4:
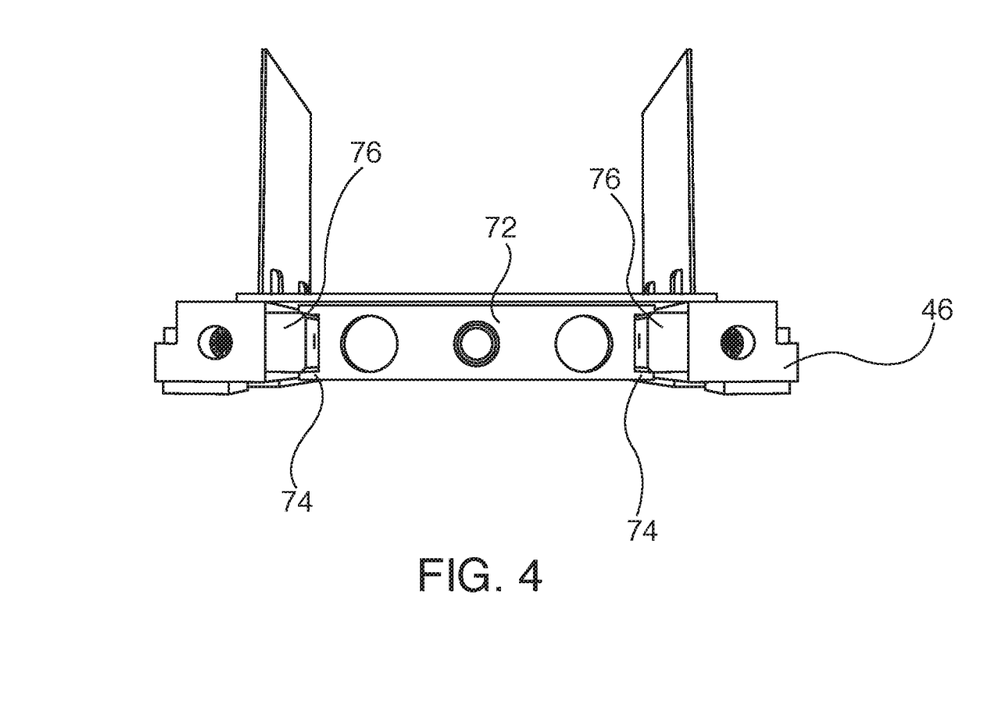
FIG. 4 is a view of a second support along view line 4-4 of FIG. 3.

The upper servo motor 54 and upper slip ring 62 are attached to first 70 and second 72 plates that are moveable in a vertical direction 82 with respect to the first 44 and second 46 supports, respectively. Referring to FIG. 4, a view of the second support 46 along view line 4-4 of FIG. 3 is shown. The second plate 72 may include spaced apart vertical channels 74 for receiving vertical guides 76 extending from the second support 46 to enable slidable movement of the second plate 72 in the vertical direction 82. It is understood that the first plate 70 also includes spaced apart vertical channels 74 for receiving vertical guides 76 that extend from the first support 44 to enable slidable movement of the first plate 70 in the vertical direction 82. The first 44 and second 46 supports further include first 78 and second 80 vertical screws to enable adjustment of the first 70 and second 72 plates, respectively, and thus the upper shaft 50, in the vertical direction 82.

Figure 5:
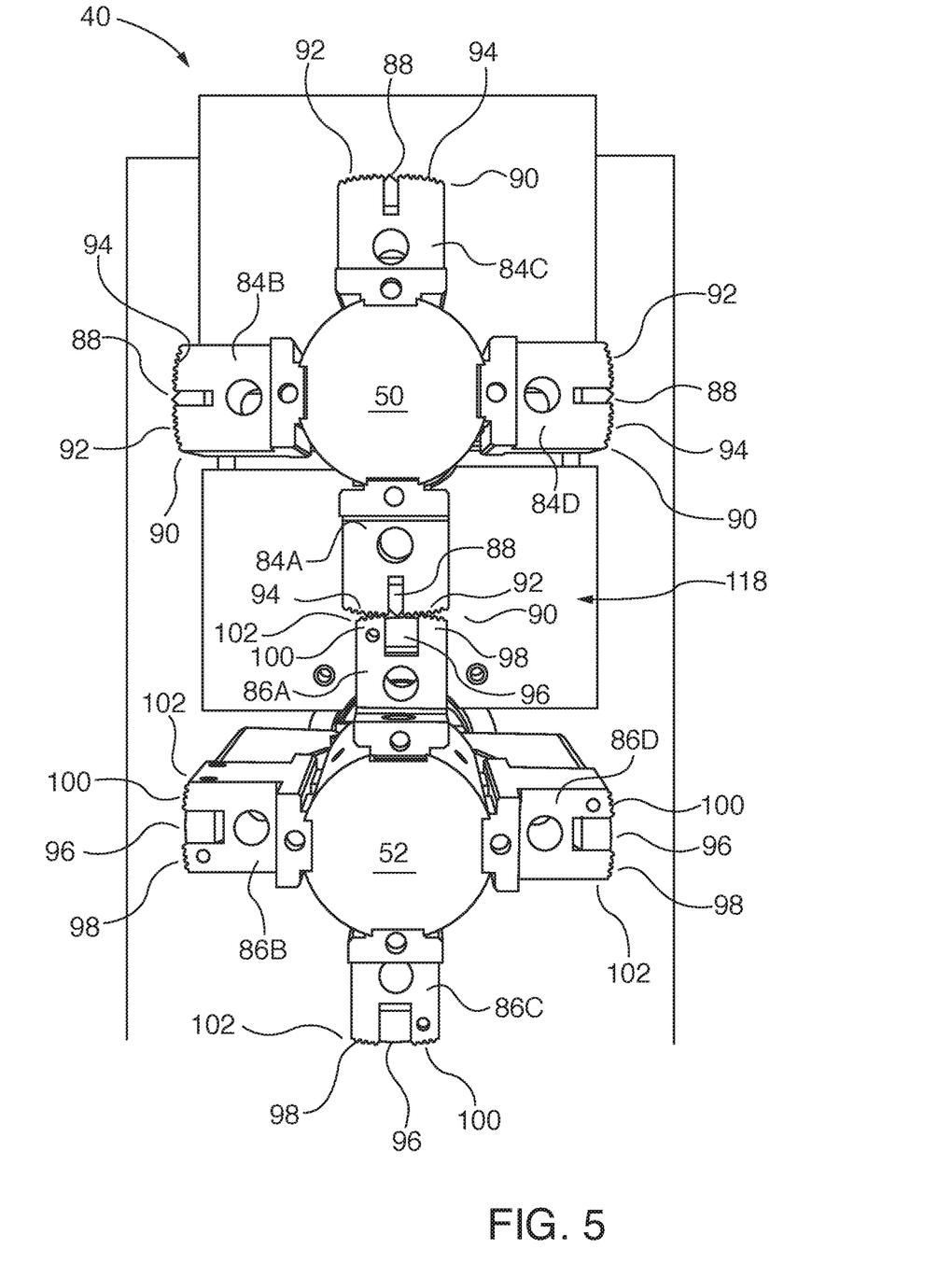
FIG. 5 is a view of upper and lower shafts of the head along view line 5-5 of FIG. 2.

Referring to FIG. 5, a view of the upper 50 and lower 52 shafts along view line 5-5 of FIG. 2 is shown. The upper shaft 50 includes a plurality of knife elements and the lower shaft 52 includes a corresponding plurality of anvil elements. For purposes of illustration, first 84A, second 84B, third 84C and fourth 84D knife elements and corresponding first 86A, second 86B, third 86C and fourth 86D anvil elements, respectively, are shown. In operation, the upper 50 and lower 52 shafts rotate, thereby rotating knife elements 84A, 84B, 84C, 84D about the upper shaft 50 and anvil elements 86A, 86B, 86C, 86D about the lower shaft 52.

The knife elements 84A, 84B, 84C, 84D each include a cutting instrument such as a blade 88 that extends from a knife contact surface 90. Each blade 88 is located between first 92 and second 94 upper crimping elements formed on the knife contact surface 90. The anvil elements 86A, 86B, 86C, 86D each include an anvil 96 located between first 98 and second 100 lower crimping elements formed on an anvil contact surface 102 of each anvil element 86A, 86B, 86C, 86D.

Figure 6:
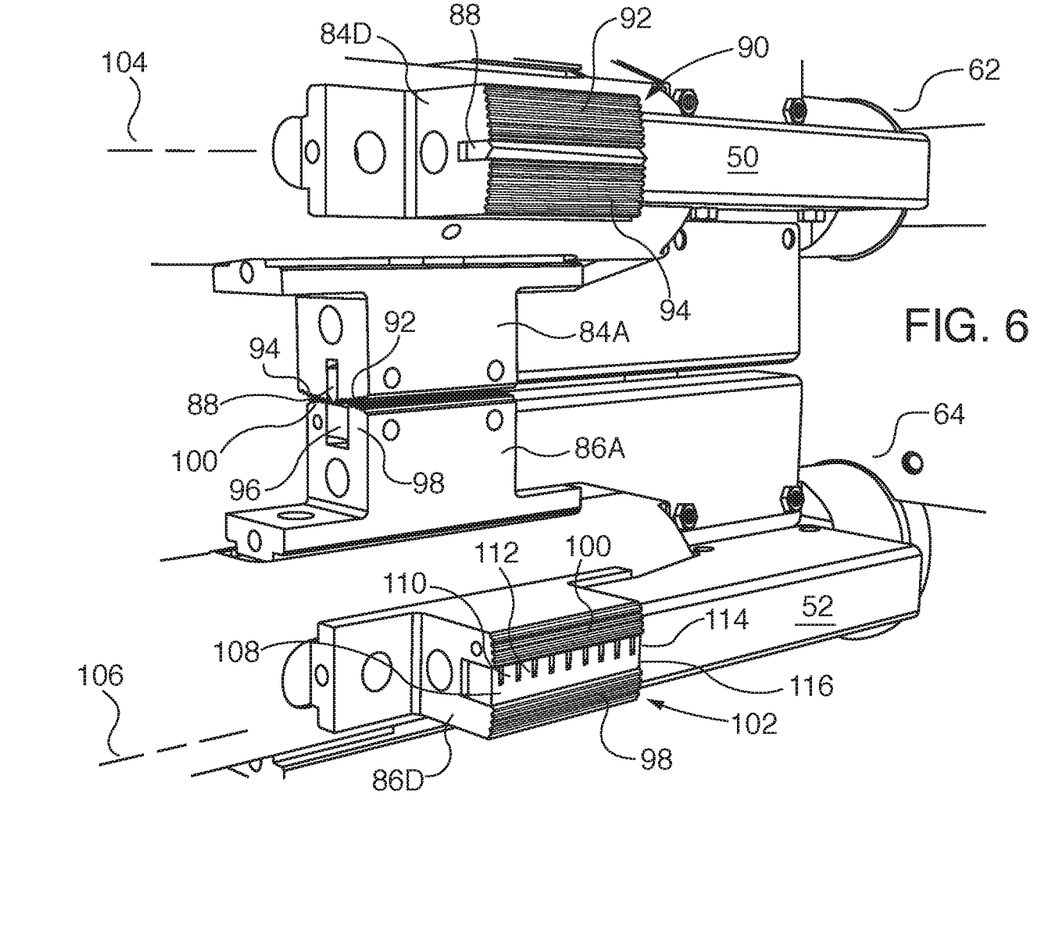
FIG. 6 is a perspective view of a fourth knife element and fourth anvil element of the head.

Referring to FIG. 6, a perspective view of the fourth knife element 84D and fourth anvil element 86D is shown. It is noted that the description of the fourth knife 84D and fourth anvil 86D elements is also applicable to the first 84A, second 84B and third 84C knife elements and the first 86A, second 86B and third 86C anvil elements. The blade 88 and first 92 and second 94 upper crimping elements have an elongated configuration and extend in an axial direction along a knife axis parallel 104 to the upper axis 58. The anvil 96 and first 98 and second 100 lower crimping elements have a corresponding elongated configuration and extend in an axial direction along an anvil axis parallel 106 to the lower axis 60. The blade 88, anvil 96, first 92 and second 94 upper crimping elements and first 98 and second 100 lower crimping elements are sized in the axial direction to correspond to a size, such as a package width W, of a product package (see FIG. 8). The anvil 96 includes a strike surface 108 having a row of thin slots 110 oriented transverse to the anvil axis 106. The slots 110 are separated by flat sections 112 to form a longitudinal perforation surface 114. The strike surface 108 also includes a flat cutting surface 116 located adjacent the perforation surface 114.

Referring back to FIG. 5, rotation of the upper 50 and lower 52 shafts is coordinated such that the first 84A, second 84B, third 84C and fourth 84D knife elements and corresponding first 86A, second 86B, third 86C and fourth 86D anvil elements, respectively, sequentially rotate toward each other. The knife elements 84A, 84B, 84C, 84D and anvil elements 86A, 86B, 86C, 86D are located opposite each other in a contact position 118 when each knife element 84A, 84B, 84C, 84D is at the bottom of its rotation and a corresponding anvil element 86A, 86B, 86C, 86D is at the top of its rotation, respectively, thereby forming pairs of knife and anvil elements (i.e. knife/anvil pairs 84A/86A, 84B/86B, 84C/86C, 84D/86D) at the contact position 118. For purposes of illustration, knife/anvil pair 84A/86A is shown in FIG. 5. The knife elements 84A, 84B, 84C, 84D and anvil elements 86A, 86B, 86C, 86D subsequently rotate away from each other as the upper 50 and lower 52 shafts continue to rotate.

Figure 7A:
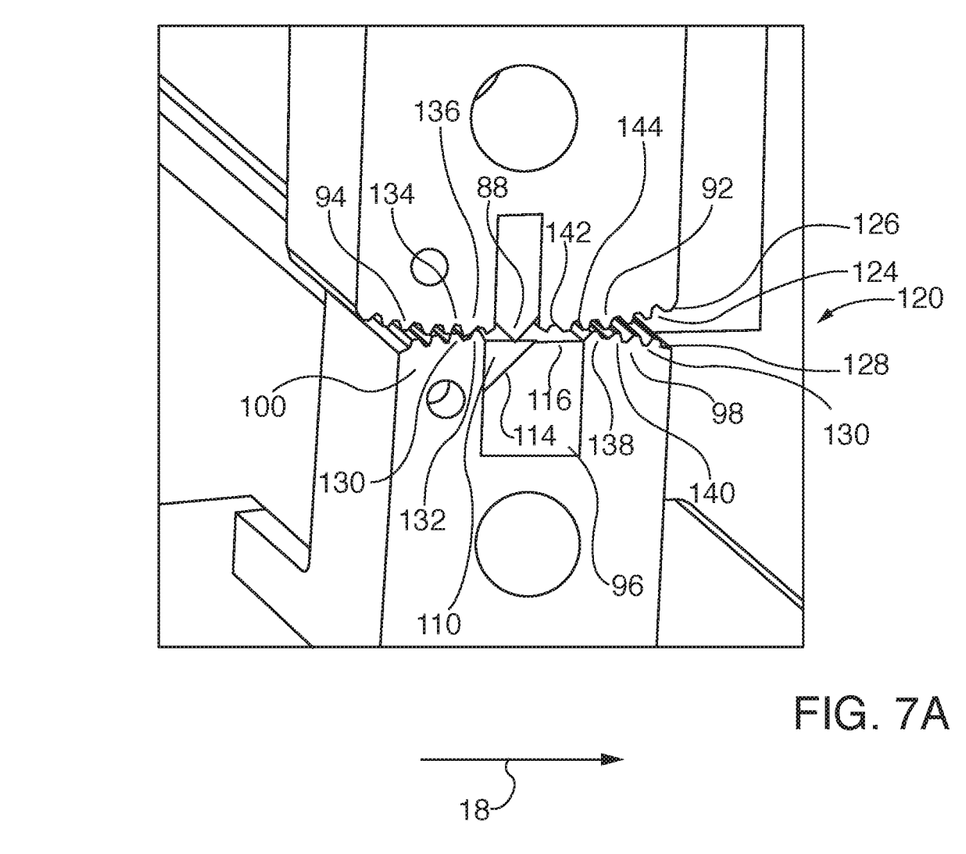
FIGS. 7A and 7B are perspective views of an anvil located in a perforation position and a cutting position, respectively.
Figure 7B:
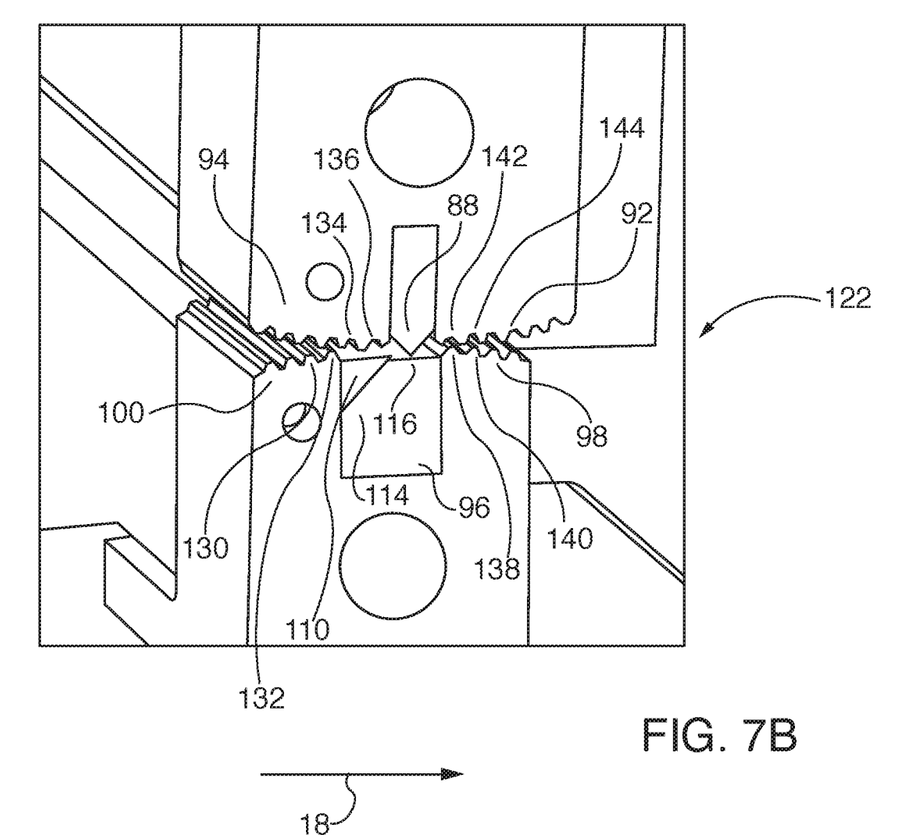

The contact position 118 includes positioning the anvil 96 in either a perforation position or a cutting position. Referring to FIG. 7A, a perspective view of the anvil 96 located in a perforation position 120 is shown. In the perforation position 120, the perforation surface 114 is located opposite the blade 88. Referring to FIG. 7B, a perspective view of the anvil 96 located in a cutting position 122 is shown. In the cutting position 122, the cutting surface 116 is located opposite the blade 88. Further, the blade 88, perforation 114 and cutting 116 surfaces are oriented transverse to the product flow direction 18.

During operation, the upper 54 and lower 56 servo motors initially rotate the upper 50 and lower 52 shafts, respectively, at substantially the same predetermined rotation speed. The packaging material 22 is moved by the conveyor belt 16 between each blade 88 of the knife elements 84A, 84B, 84C, 84D and each anvil 96 of the anvil elements 86A, 86B, 86C, 86D as the knife 84A, 84B, 84C, 84D and anvil elements 86A, 86B, 86C, 86D rotate. Each anvil 96 is positioned in either the perforation 120 or cutting 122 positions. In the perforation position 120, the blade 88 perforates the packaging material 22 in areas corresponding to the flats 112 whereas portions of the packaging material 22 corresponding to the slots 110 are not perforated. Thus, a first package is connected to a next or second package by portions of the packaging material 22 that are not perforated. In the cutting position 122, the blade 88 cuts through the packaging material 22 along the entire cutting surface 116, thus separating packages.

In accordance with an aspect of the invention, an anvil 96 is moved from the perforation position 120 to the cutting position 122, while the upper 50 and lower 52 shafts are each rotating at the same predetermined rotation speed, by increasing the rotation speed of the lower shaft 52 relative to the upper shaft 50. In particular, the controller 85 causes the lower servo motor 56 to increase the rotation speed of the lower shaft 52 for a predetermined time period in order to change the relative motion of the lower shaft 52 with respect to the upper shaft 50. In an embodiment, an angular change of approximately 1.75 degrees is sufficient to move the anvil 96 from the perforation position 120 to the cutting 122 position. The angular change is detected by the upper 66 and lower 68 rotary encoders. In order to move the anvil 96 back to the perforation position 120, the rotation speed of the lower shaft 52 is decreased by substantially same amount used to move from the perforation position 120 to the cutting position 122. In an alternate embodiment, the rotation speed of the upper shaft 50 is increased rather than increasing the rotation speed of the lower shaft 52 in order to move to either the perforation 120 or cutting 122 positions.

The first 92 and second 94 upper crimping elements include a plurality of upper grooves 124 and upper teeth 126. In addition, the first 98 and second 100 lower crimping elements include corresponding lower teeth 128 and lower grooves 130 that mate or mesh with the upper grooves 124 and upper teeth 126, respectively. In particular, the upper grooves 124 receive the lower teeth 128 and the lower grooves 130 receive the upper teeth 126. Contact between the upper grooves 124 and the lower teeth 128 and the lower grooves 130 and the upper teeth 126 serves to crimp the packaging material 22. Further, knife elements 84A, 84B, 84C, 84D and anvil elements 86A, 86B, 86C, 86D each include heating elements that receive electrical power used to actuate the heating elements via the upper 62 and lower 64 slip rings. Crimping of the package material 22 in conjunction with the application of heat generated by the heating elements results in the formation of a package seal. Crimping occurs when the anvil 96 is in either the perforation position 120 or the cutting position 122, i.e. whenever the knife elements 84A, 84B, 84C, 84D and anvil elements 86A, 86B, 86C, 86D are the contact position 118.

Movement between the perforation position 120 and the cutting position 122 causes a shift in the teeth 128, 126 and grooves 124, 130, respectively, that mate. For example, first 130 and second 132 lower teeth are received by corresponding first 134 and second 136 upper grooves when the anvil 96 is located in the perforation position 120 (FIG. 7A). In this position, third 142 and fourth 144 upper grooves are not engaged with teeth. In the cutting position 122 (FIG. 7B), third 138 and fourth 140 lower teeth are received by corresponding third 142 and fourth 144 upper grooves whereas the first 134 and second 136 upper grooves are no longer engaged.

Figure 8:
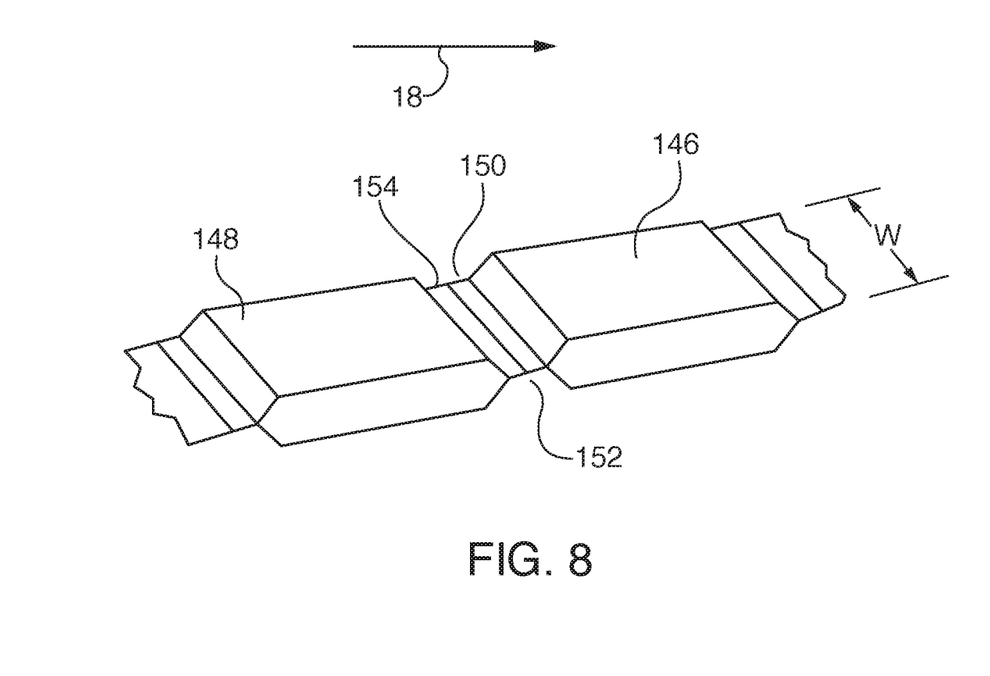
FIG. 8 is a perspective view of exemplary first and second product packages.

During operation, the packaging material 22 moves in the product flow direction 18, for example. Referring to FIG. 8, exemplary first 146 and second 148 packages are shown. When an anvil 96 is in the perforation position 120 (FIG. 7A), the first upper 92 and first lower 98 crimping elements crimp a rear part 150 of the first package 146. Next, the blade 88 perforates the packaging material 22 in a perforation portion 152 as the packaging material 22 moves in the product flow direction 18. The second upper 94 and second lower 100 crimping elements then crimp a front part 154 of the second package 148 to provide a seal-perforate-seal sequence wherein the seals and perforation are oriented transverse to the product flow direction 18. For example, in order to form a bandolier having five packages, the anvils 96 of anvil elements 86A, 86B, 86C, 86D are moved to the perforation position 120 to form first, second, third and fourth perforations, respectively. Further, the anvils 96 form seals before and after each perforation as previously described, thus forming four packages. The anvil 96 for the next anvil element 86A, 86B, 86C, 86D in rotation (i.e. first anvil element 86A in this example) is then moved to the cutting position 122 in order to form another seal and cut the packaging material 22 so as to form a fifth package and thus a bandolier having five packages.

In an aspect of the current invention, sealing, perforation and cutting of packaging material 22 is accomplished in a single head 40 which substantially increases package output. In another aspect of the invention, first 54 and second 56 servo motors are used to independently drive the upper 50 and lower 52 shafts, respectively, rather than using a gear train and/or belt arrangement to drive a second shaft or change a phase angle of a shaft. This reduces rotational inertia and also increases package output relative to conventional packaging machines 10. For example, output may be increased from approximately 300 parts per minute to approximately 1000 parts per minute. Further, the current invention reduces wear of packaging machine components.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A head for a horizontal flow wrapper packaging machine for forming a bandolier of product packages from a packaging material, comprising:

a rotatable first shaft having a plurality of knife elements each including a blade and first and second upper crimping elements;

a rotatable second shaft having a corresponding plurality of anvil elements, wherein a rotation speed of the second shaft is independent of the rotation speed of the first shaft and wherein each anvil element includes perforation and cutting surfaces and first and second lower crimping elements, wherein a rotation speed of either the first shaft or second shaft is changed to move either a knife element or an anvil element, respectively, between either a perforation position wherein the perforation surface is opposite the blade to perforate the packaging material or a cutting position wherein the cutting surface is opposite the blade to cut the packaging material and wherein the first upper and first lower crimping elements mate and the second upper and second lower crimping elements mate to crimp the packaging material in either the perforating or cutting positions; and wherein the first and second shafts are rotated by first and second motors, respectively.

2. The head according to claim 1, further including a controller for independently controlling a rotation speed of the first and second shafts.

3. The head according to claim 1, wherein an angular change of approximately 1.75 degrees for either the first or second shaft is sufficient to move between the perforation and cutting positions.

4. The head according to claim 1, wherein the blade is located between the first and second upper crimping elements.

5. The head according to claim 1, wherein the perforation and cutting surfaces are located between the first and second lower crimping elements.

6. The head according to claim 1, wherein the first and second upper crimping elements and the first and second lower crimping elements each include a plurality of mating teeth and grooves.

7. The head according to claim 6, wherein the mating teeth and grooves shift when moving between the perforation and cutting positions.

8. A method for forming a bandolier of product packages from a packaging material when using a horizontal flow wrapper packaging machine, comprising:

providing a head having a rotatable first shaft having a plurality of knife elements each including a blade and first and second upper crimping elements;

providing in the head a rotatable second shaft having a corresponding plurality of anvil elements, wherein a rotation speed of the second shaft is independent of the rotation speed of the first shaft and wherein each anvil element includes perforation and cutting surfaces and first and second lower crimping elements;

changing a rotation speed of either the first shaft or second shaft to move either a knife element or an anvil element, respectively, between either a perforation position wherein the perforation surface is opposite the blade to perforate the packaging material or a cutting position wherein the cutting surface is opposite the blade to cut the packaging material; and mating the first upper and first lower crimping elements and the second upper and second lower crimping elements to crimp the packaging material in either the perforating or cutting positions.

9. The method according to claim 8, wherein the first and second shafts are rotated by first and second servo motors, respectively.

10. The method according to claim 9, further including a controller for independently controlling a rotation speed of the first and second shafts.

11. The method according to claim 1, wherein an angular change of approximately 1.75 degrees for either the first or second shaft is sufficient to move between the perforation and cutting positions.

12. The method according to claim 8, wherein the blade is located between the first and second upper crimping elements.

13. The method according to claim 8, wherein the perforation and cutting surfaces are located between the first and second lower crimping elements.

14. The method according to claim 8, wherein the first and second upper crimping elements and the first and second lower crimping elements each include a plurality of mating teeth and grooves.

15. The method according to claim 14, wherein the mating teeth and grooves shift when moving between the perforation and cutting positions.

16. A head for a horizontal flow wrapper packaging machine for forming a bandolier of product packages from a packaging material, comprising:

a first motor for rotating a first shaft having a plurality of knife elements each including a blade located between first and second upper crimping elements;

a second motor for rotating a second shaft having a plurality of anvil elements, wherein a rotation speed of the second shaft is independent of the rotation speed of the first shaft and wherein each anvil element includes perforation and cutting surfaces located between first and second lower crimping elements; and a controller for changing a rotation speed of the second shaft to move an anvil element between either a perforation position wherein the perforation surface is opposite the blade to perforate the packaging material or a cutting position wherein the cutting surface is opposite the blade to cut the packaging material and wherein the first upper and first lower crimping elements mate and the second upper and second lower crimping elements mate to crimp the packaging material when the anvil element is in either the perforating or cutting positions.

17. The head according to claim 16, wherein an angular change of approximately 1.75 degrees for the second shaft is sufficient to move between the perforation and cutting positions.

18. The head according to claim 16, wherein the first and second upper crimping elements and the first and second lower crimping elements each include a plurality of mating teeth and grooves.

19. The head according to claim 16, wherein the mating teeth and grooves shift when moving between the perforation and cutting positions.

* * * * *